(12) United States Patent
Gao et al.

(10) Patent No.: US 10,914,884 B2
(45) Date of Patent: Feb. 9, 2021

(54) BACKLIGHT MODULE AND MANUFACTURING METHOD THEREOF, DISPLAY DEVICE AND LIGHT GUIDE DEVICE

(71) Applicant: BOE TECHNOLOGY GROUP CO., LTD., Beijing (CN)

(72) Inventors: Jian Gao, Beijing (CN); Xiaochuan Chen, Beijing (CN); Wei Wang, Beijing (CN); Jifeng Tan, Beijing (CN); Xiandong Meng, Beijing (CN); Xianqin Meng, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 297 days.

(21) Appl. No.: 16/097,503

(22) PCT Filed: Feb. 1, 2018

(86) PCT No.: PCT/CN2018/074950
§ 371 (c)(1),
(2) Date: Oct. 29, 2018

(87) PCT Pub. No.: WO2019/019598
PCT Pub. Date: Jan. 31, 2019

(65) Prior Publication Data
US 2020/0326465 A1 Oct. 15, 2020

(30) Foreign Application Priority Data
Jul. 28, 2017 (CN) .......................... 2017 1 0628510

(51) Int. Cl.
*F21V 8/00* (2006.01)

(52) U.S. Cl.
CPC .......... *G02B 6/0038* (2013.01); *G02B 6/0031* (2013.01); *G02B 6/0043* (2013.01); *G02B 6/0076* (2013.01)

(58) Field of Classification Search
CPC .. G02B 6/0031; G02B 6/0038; G02B 6/0043; G02B 6/0079
See application file for complete search history.

(56) References Cited

U.S. PATENT DOCUMENTS

2011/0141395 A1 6/2011 Yashiro

FOREIGN PATENT DOCUMENTS

| CN | 101696785 A | 4/2010 |
| CN | 101699152 A | 4/2010 |

(Continued)

OTHER PUBLICATIONS

International Search Report of PCT/CN2018/074950 in Chinese, dated Apr. 27, 2018, with English translation.

(Continued)

*Primary Examiner* — Thomas M Sember
(74) *Attorney, Agent, or Firm* — Collard & Roe, P.C.

(57) ABSTRACT

A backlight module, a manufacturing method thereof, a display device and a light guide device are provided. The backlight module includes: a light guide structure, including a volume grating layer, the volume grating layer including a plurality of volume grating portions and a light guide portion between adjacent volume grating portions, the plurality of volume grating portions being configured to introduce a beam of a specific wavelength into the light guide portion; and a light extraction structure, located on a light exit side of the light guide structure, wherein a refractive index of the light guide structure is greater than a refractive index of the light extraction structure, and an incident angle of the beam introduced into the light guide portion on a plane where the (Continued)

light guide portion is located is not less than a total reflection critical angle of the light guide structure.

18 Claims, 3 Drawing Sheets

(56) References Cited

FOREIGN PATENT DOCUMENTS

| | | |
|---|---|---|
| CN | 105700226 A | 6/2016 |
| CN | 107315280 A | 11/2017 |
| KR | 101342482 B1 | 12/2013 |

OTHER PUBLICATIONS

Notice of Transmittal of the International Search Report of PCT/CN2018/074950 in Chinese, dated Apr. 27, 2018.

Written Opinion of the International Searching Authority of PCT/CN2018/074950 in Chinese, dated Apr. 27, 2018 with English translation.

BACKLIGHT MODULE AND MANUFACTURING METHOD THEREOF, DISPLAY DEVICE AND LIGHT GUIDE DEVICE

CROSS-REFERENCE TO RELATED APPLICATION

This application is the National Stage of PCT/CN2018/074950 filed on Feb. 1, 2018, which claims priority under 35 U.S.C. § 119 of Chinese Application No. 201710628510.7 filed on Jul. 28, 2017, the disclosure of which is incorporated by reference.

TECHNICAL FIELD

At least one embodiment of the present disclosure relates to a backlight module and a manufacturing method thereof, a display device and a light guide device.

BACKGROUND

In the current backlight processing of direct-lit type light emitting diodes (LEDs), local dimming technology can greatly reduce power consumption, improve imaging contrast, increase grayscale and reduce image sticking. Therefore, for liquid crystal display panels with large-size, the use of direct-lit type backlight modules has become a trend.

SUMMARY

At least one embodiment of the present disclosure provides a backlight module and a manufacturing method thereof, a display device and a light guide device. A volume grating structure in the backlight module can introduce an incident beam emitted by a light source into a light guide portion, the beam introduced into the light guide portion can be totally reflected and propagated in the light guiding structure, and uniformly extracted by a light extraction structure. On one hand, the backlight module can fully utilize light energy. On the other hand, the light source in the backlight module does not need a light mixing height, thereby effectively reducing a thickness of the backlight module.

At least one embodiment of the present disclosure provides a backlight module, including: a light guide structure, including a volume grating layer, the volume grating layer including a plurality of volume grating portions arranged in an array and a light guide portion between adjacent ones of the plurality of volume grating portions, the plurality of volume grating portions being configured to introduce a beam of a specific wavelength into the light guide portion; and a light extraction structure, located on a light exit side of the light guide structure, wherein a refractive index of the light guide structure is greater than a refractive index of the light extraction structure, and an incident angle of the beam introduced into the light guide portion on a plane where the light guide portion is located is not less than a total reflection critical angle of the light guide structure.

For example, in the backlight module provided by an embodiment of the present disclosure, further including: a light source layer, including a plurality of light sources arranged in an array, an orthogonal projection of each of the plurality of light sources on the volume grating layer falling within one of the plurality of volume grating portions, wherein the light guide structure is located on a light exit side of the light source layer, and the refractive index of the light guide structure is greater than a refractive index of the light source layer.

For example, in the backlight module provided by an embodiment of the present disclosure, the light guide structure further includes a light guide plate, the light guide plate is located on a side of the volume grating layer away from the light extraction structure, the plurality of volume grating portions are further configured to introduce the beam of the specific wavelength into the light guide plate, and an incident angle of the beam introduced into the light guide plate on a plane where the light guide plate is located is not less than the total reflection critical angle of the light guide structure.

For example, in the backlight module provided by an embodiment of the present disclosure, a refractive index of the light guide portion of the volume grating layer is equal to a refractive index of the light guide plate.

For example, in the backlight module provided by an embodiment of the present disclosure, the plurality of volume grating portions include a grating fringe surface, the grating fringe surface is located on an angle bisector of an angle between an incident direction of an incident beam and an emergent direction of an emergent beam in the volume grating layer.

For example, in the backlight module provided by an embodiment of the present disclosure, the volume grating layer is a stacked structure, including: a first volume grating layer, including a first volume grating portion, the first volume grating portion being configured to only introduce light of a first color in the incident beam into the light guide portion and the light guide plate, wherein the first volume grating portion includes a first grating fringe surface; a second volume grating layer, including a second volume grating portion, the second volume grating portion being configured to only introduce light of a second color in the incident beam into the light guide portion and the light guide plate, wherein the second volume grating portion includes a second grating fringe surface; a third volume grating layer, including a third volume grating portion, the third volume grating portion being configured to only introduce light of a third color in the incident beam into the light guide portion and the light guide plate, wherein the third volume grating portion includes a third grating fringe surface.

For example, in the backlight module provided by an embodiment of the present disclosure, each of the first volume grating layer, the second volume grating layer and the third volume grating layer has a thickness in a range of 5-20 µm.

For example, in the backlight module provided by an embodiment of the present disclosure, a grating fringe period of the first volume grating portion, a grating fringe period of the second volume grating portion, and a grating fringe period of the third volume grating portion are not all equal, and/or, an angle between the first grating fringe surface and the incident beam, an angle between the second grating fringe surface and the incident beam, and an angle between the third grating fringe surface and the incident beam are not all equal.

For example, in the backlight module provided by an embodiment of the present disclosure, a thickness of the light guide plate is not greater than 1 mm.

For example, in the backlight module provided by an embodiment of the present disclosure, the light sources are collimation light sources.

For example, in the backlight module provided by an embodiment of the present disclosure, the light extraction structure including: a dot film, located on a surface of a light exit side of the volume grating layer.

For example, in the backlight module provided by an embodiment of the present disclosure, further including: a reflective layer, located on a side of the light source layer away from the light guide structure.

For example, in the backlight module provided by an embodiment of the present disclosure, further including: a driver circuit, connected with the plurality of light sources, and configured to adjust luminous intensity of each of the plurality of light sources.

At least one embodiment of the present disclosure provides a manufacturing method of a backlight module, including: forming a light guide structure, including forming a volume grating layer, the volume grating layer including a plurality of volume grating portions arranged in an array and a light guide portion between adjacent ones of the plurality of volume grating portions, the plurality of volume grating portions being configured to introduce a beam of a specific wavelength into the light guide portion; and forming a light extraction structure on a light exit side of the light guide structure, wherein a refractive index of the light guide structure is greater than a refractive index of the light extraction structure, and an incident angle of the beam introduced into the light guide portion on a plane where the light guide portion is located is not less than a total reflection critical angle of the light guide structure.

For example, in the manufacturing method of the backlight module provided by an embodiment of the present disclosure, further including: disposing a light source layer on a light incident side of the light guide structure, wherein the light source layer includes a plurality of light sources arranged in an array, an orthogonal projection of each of the plurality of light sources on the volume grating layer falls within one of the plurality of volume grating portions, and the refractive index of the light guide structure is greater than a refractive index of the light source layer.

For example, in the manufacturing method of the backlight module provided by an embodiment of the present disclosure, forming the plurality of volume grating portions including: irradiating and exposing both sides of a photorefractive material by two plane light waves, the two plane light waves interfering in the photorefractive material and forming interference fringes to form the plurality of volume grating portions, the photorefractive material after forming the plurality of volume grating portions being the volume grating layer.

For example, in the manufacturing method of the backlight module provided by an embodiment of the present disclosure, forming the light guide structure further includes forming a light guide plate, the light source layer is disposed on a main plate surface of the light guide plate, the volume grating layer is formed on a side of the light guide plate away from the light source layer, the plurality of volume grating portions are further configured to introduce the beam of the specific wavelength into the light guide plate, and an incident angle of the beam introduced into the light guide plate on a plane where the light guide plate is located is not less than the total reflection critical angle of the light guide structure.

At least one embodiment of the present disclosure provides a display device, including the backlight module provided by any embodiment as mentioned above.

At least one embodiment of the present disclosure provides a light guide device, including: a light guide structure, including a volume grating layer, the volume grating layer including a plurality of volume grating portions arranged in an array and a light guide portion between adjacent ones of the plurality of volume grating portions, the plurality of volume grating portions being configured to introduce a beam of a specific wavelength into the light guide portion; and a light extraction structure, located on a light exit side of the light guide structure, wherein a refractive index of the light guide structure is greater than a refractive index of the light extraction structure, and an incident angle of the beam introduced into the light guide portion on a plane where the light guide portion is located is not less than a total reflection critical angle of the light guide structure.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

Figure 1:
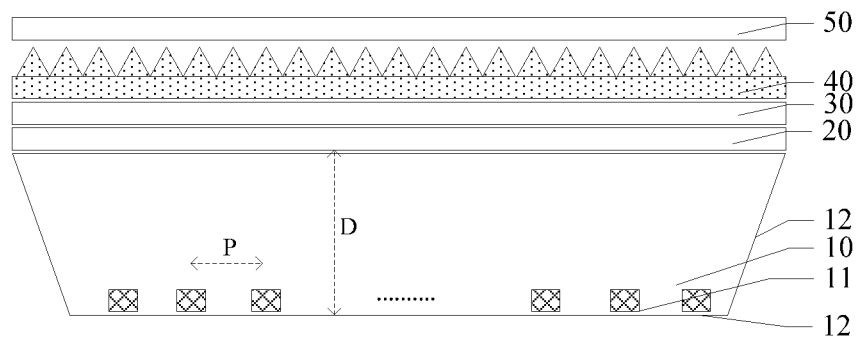
FIG. 1 is a view of a backlight module of a direct-lit type light emitting diode.

FIG. 1 is a view of a direct-lit type light emitting diode backlight module. As illustrated in FIG. 1, a light-emitting diode array is located on a side of a light-emitting layer 10 (that is a backlight cavity) away from a diffusion plate 20 (that is a bottom of the light-emitting layer 10). Light emitted by each of light sources 11 can form a uniform energy distribution on a side the light-emitting layer 10 (that is the backlight cavity) close to the diffusion plate 20 (that is a top of the light-emitting layer 10) by a certain height of light mixing. In order to uniformly extract the light emitted from the light-emitting layer 10, a first diffusion sheet 30, a prism layer 40, and a second diffusion sheet 50 are disposed on a side of the diffusion plate 20 away from the light-emitting layer 10.

For example, a material of the diffusion plate 20 can be a transparent material such as polymethyl methacrylate (PMMA) or polycarbonate (PC), which has a large thickness, and a light transmittance of 50%-80%.

For example, the first diffusion sheet 30 is considered to have a high haze degree, and a material of the first diffusion sheet 30 is generally selected from materials such as polyethylene terephthalate (PET) or polycarbonate. The first diffusion sheet 30 is located on a side of the diffusion plate 20 away from the light-emitting layer 10 to make light distribute more uniform.

For example, the prism layer 40 can be a microstructure such as polymethyl methacrylate having a zigzag or wavy shape, and the prism layer 40 has a good concentrating effect.

For example, the second diffusion sheet 50 selects a material having a high transmittance and a low haze degree, and the second diffusion sheet 50 can serve as a structure for protecting the prism layer 40.

Furthermore, in order to improve the utilization of the light source, the backlight module further includes a reflective layer 12 disposed on a lateral side of a layer where the light source 11 is located and a side of the layer where the light source 11 is located away from a light exit side.

In the study, the inventor(s) of the present application has found that: in order to achieve goals such as cost saving and power consumption reduction, a spacing P between two adjacent light sources 11 is set to be larger, that is, the light sources 11 are set to be sparse. In the same time, in order to ensure better uniformity of light emitted by the backlight module, a distance d between the light sources 11 and the diffusion sheet 20 is set to be larger. According to an empirical formula, D/P>1.2. For example, a backlight module in 82 inch display screen is taken as an example for description, the spacing P between two adjacent light sources 11 is 2.2 cm. In order to ensure uniformity of light emitted by the backlight module, the distance d between the light sources 11 and the diffusion sheet 20 is greater than 2.64 cm (2.2*1.2=2.64 cm). Therefore, a thickness of the direct-lit type backlight module is large, thereby reducing market competitiveness of products.

A backlight module and a manufacturing method thereof, a display device and a light guide device are provided by embodiments of the present disclosure. The backlight module includes a light guide structure, including a volume grating layer, the volume grating layer including a plurality of volume grating portions arranged in an array and a light guide portion between adjacent ones of the plurality of volume grating portions, the plurality of volume grating portions being configured to introduce a beam of a specific wavelength into the light guide portion; and a light extraction structure, located on a light exit side of the light guide structure, wherein a refractive index of the light guide structure is greater than a refractive index of the light extraction structure, and an incident angle of the beam introduced into the light guide portion on a plane where the light guide portion is located is not less than a total reflection critical angle of the light guide structure. The volume grating portion in the backlight module can introduce an incident beam emitted by a light source into the light guide portion, the beam introduced into the light guide portion is totally reflected and propagated in the light guide structure, and uniformly extracted by the light extraction structure. On one hand, the backlight module can fully utilize the light energy; on the other hand, the light source in the backlight module does not need a light mixing height, thereby effectively reducing a thickness of the backlight module.

Hereinafter, the backlight module and the manufacturing method thereof, the display device and the light guide device provided by the embodiments of the present disclosure will be described with reference to the accompanying drawings.

Figure 2A:
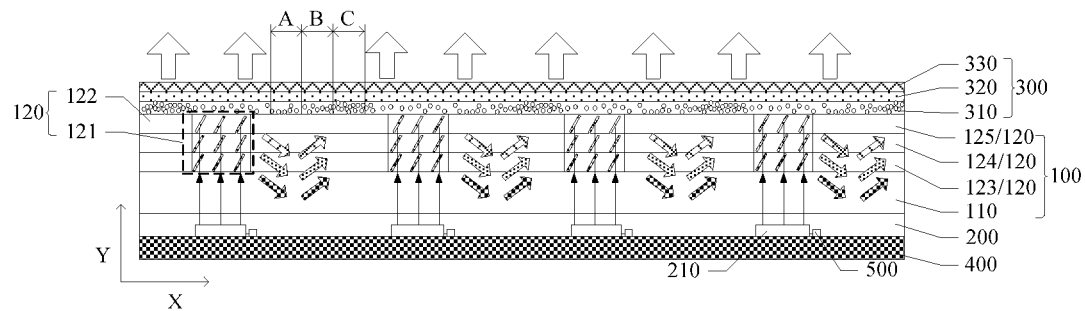
FIG. 2A is a partial view of a backlight module provided by an embodiment of the present disclosure.

An embodiment of the present disclosure provides a backlight module, FIG. 2A is a partial view of a backlight module provided by an embodiment of the present disclosure. As illustrated in FIG. 2A, the backlight module includes: a light guide structure 100 and a light extraction structure 300. The light guide structure 100 includes a volume grating layer 120, the volume grating layer 120 includes a plurality of volume grating portions 121 arranged in an array and a light guide portion 122 between adjacent ones of the plurality of volume grating portions 121, the plurality of volume grating portions 121 are configured to introduce a beam incident into the volume grating layer 120 into the light guide portion 122, and an incident angle of the beam introduced into the light guide portion 122 on a plane where the light guide portion 122 is located is not less than a total reflection critical angle of the light guide structure 100; the light extraction structure 300 is located on a light exit side of the light guide structure 100, and a refractive index of the light guide structure 100 is greater than a refractive index of the light extraction structure 300.

For example, the backlight module further includes a light source layer 200, the light source layer 200 includes a plurality of light sources 210 arranged in an array, an orthogonal projection of each of the plurality of light sources 210 on the volume grating layer 120 falls within the volume grating portions 121, the light guide structure 100 is located on a light exit side of the light source layer 200, and the refractive index of the light guide structure 100 is greater than a refractive index of the light source layer 200.

For example, the light guide structure 100 further includes a light guide plate 100, the light source layer 200 is located on a main plate surface of the light guide plate 100, the light guide plate 100 is located on a light exit side of the light source layer 200, and the volume grating layer 120 is located on a side of the light guide plate 110 away from the light source layer 200. The volume grating portions 121 are further configured to introduce the beam incident into the volume grating layer 120 into the light guide plate 110, and an incident angle of the beam introduced into the light guide plate 110 on a plane where the light guide plate 110 is located is not less than the total reflection critical angle of the light guide structure 100. The light guide portion 122 in the volume grating layer 120 is configured to make the beam totally reflected from the light guide plate 110 to the volume grating layer 120 continue to be totally reflected and propagated.

In the present embodiment, because the incident angle of the beam introduced into the light guide portion and the light guide plate from the volume grating layer on a plane where the light guide plate is located is not less than the total reflection critical angle of the light guide structure, the beam introduced into the light guide portion and the light guide plate will be totally reflected and propagated in the light guide structure, and uniformly extracted by the light extraction structure. On one hand, the backlight module provided by embodiments of the present disclosure can fully utilize the light energy, and because there is no special requirement for the spacing between light sources, the number of the light sources can be reduced and the cost can be reduced while satisfying the overall brightness; on the other hand, the light source in the backlight module provided by embodiments of the present disclosure does not need a light mixing height, thereby effectively reducing a thickness of the backlight module.

It should be noted that, "an array" in "a plurality of volume grating portions arranged in an array" and "a plurality of light sources arranged in an array" includes one-dimensional array or two-dimensional array.

Figure 2B:
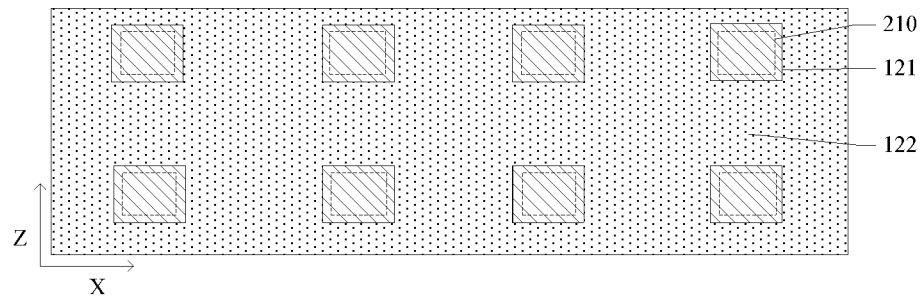
FIG. 2B is a partial planar view of a volume grating layer of the backlight module shown in FIG. 2A.

For example, FIG. 2B is a partial planar view of a volume grating layer of the backlight module shown in FIG. 2A. As illustrated in FIG. 2B, the plurality of volume grating portions 121 and the plurality of light sources 210 are arranged in two-dimensional array, and the light guide portion 122 is disposed around the volume grating portions 121. In a plane parallel to a plane where the light source layer 200 is located, the light guide portion 122 surrounds the volume grating portions 121, that is, the light guide portion 122 surrounds the volume grating portions 121 on the XZ plane. Because there is no light source 210 in the volume grating layer 120, the light sources 210 whose orthogonal projection falls into the volume grating portion 121 in FIG. 2B are indicated by a dashed line box. It should be noted that, the spacing between adjacent ones of the light sources in FIG. 2B is only illustrative, in fact, the spacing between adjacent ones of the light sources is small.

Figure 2C:
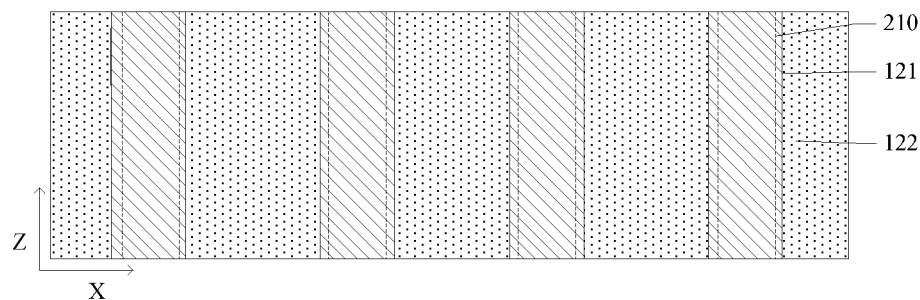
FIG. 2C is a partial planar view of a volume grating layer of the backlight module shown in FIG. 2A.

For example, FIG. 2C is a partial planar view of a volume grating layer of the backlight module provided by another example shown in FIG. 2A. As illustrated in FIG. 2C, all of the light source 210, the volume grating portion 121 and the light guide portion 122 have planar shapes of stripe-shape. And in the X direction, the volume grating portions 121 and the light guide portions 122 are alternately disposed, that is, the plurality of volume grating portions 121 and the plurality of light sources 210 are arranged in one-dimensional array (that is, they are arranged in the X direction). It should be noted that, the light source in the present example is a stripe-shaped light source, the stripe-shaped light source is extended in the Z direction and arranged in the X direction. The stripe-shaped light source can be utilized to make the light emitted from the backlight module provided by the present example more uniform.

For example, in the present embodiment, an orthogonal projection of the source light 210 on the volume grating layer 120 falls into the volume grating portion 121, which includes: the orthogonal projection of the light source 210 on the volume grating layer 120 is completely overlapped with the volume grating portion 121, or the orthogonal projection of the light source 210 on the volume grating layer 120 only falls within a part of the volume grating portion 121, the present embodiment is not limited thereto.

It should be noted that, the refractive index of the light guide portion 122 of the volume grating layer 120 in the light guide structure 100 is equal to the refractive index of the light guide plate 110, the "equal" herein includes approximately equal and completely equal.

For example, the light source 210 in the light source layer 200 is a collimation light source.

For example, the plurality of light sources 210 included in the light source layer 200 are dot-matrix lights. The dot-matrix lights can include a combination of dot-matrix light-emitting diodes (LED) and a collimation lens array, can also include a combination of a dot-matrix original light-emitting diodes (OLED) and a collimation lens array. The present embodiment is not limited, for example, the collimation light source can be acquired by other manners.

For example, as illustrated in FIG. 2A, the backlight module provided by the present disclosure further includes: a driver circuit 500, connected with the plurality of light sources 210, and configured to adjust luminous intensity of each of the plurality of light sources 210. The light source 210 in a certain region is controlled by the driving circuit 500 to not emit light to make the region in 0 gray scale region, so as to reduce the backlight brightness of the region. The driving circuit 500 herein is only a schematic diagram, and the specific circuit wiring mode of the driving circuit 500 is not limited, and the driving circuit can be set according to actual conditions.

For example, the driving circuit 500 can be a thin film transistor (TFT) to realize a dynamic adjustment of the luminous intensity of each light source 210 by a local dimming system. Therefore, the present embodiment can realize the local dimming by cooperating with a liquid crystal display device (LCD), so as to reduce the power consumption and extend the longevity of the light source.

For example, the spacing between adjacent ones of the light sources 210 can be 1-50 mm, the present embodiment includes but is not limited thereto. The specific spacing between adjacent ones of the light sources can be determined by a balance between the backlight power consumption and a local dimming control fineness in the product design.

Figure 3A:
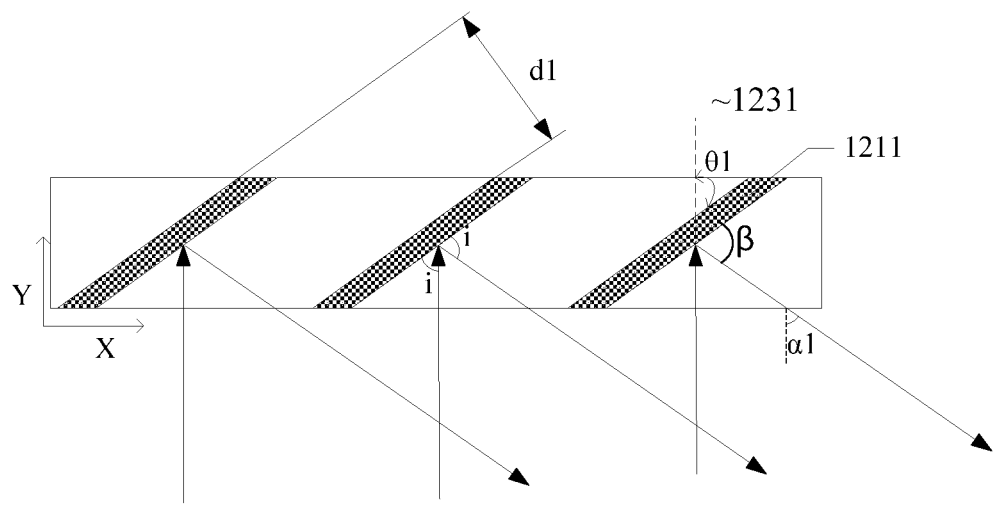
FIG. 3A is a section view of a first volume grating portion in a first volume grating layer of the backlight module shown in FIG. 2A along an XY direction.

For example, FIG. 3A is a section view of a first volume grating portion in a first volume grating layer of the backlight module shown in FIG. 2A along an XY plane. As illustrated in FIG. 2A and FIG. 3A, the volume grating layer 120 includes: a first volume grating layer 123, the first volume grating layer 123 includes a first volume grating portion 1231, the first volume grating portion 1231 includes a first grating fringe surface 1211. The first volume grating portion 1231 is configured to only introduce light of a first color in the incident beam, such as right light, into the light guide plate 110 and the light guide portion 122, and other beams other than the light of first color can transmit the first volume grating portion 1231 and continue to propagate in a direction of an original incident beam.

For example, as illustrated in FIG. 3A, the first volume grating portion 1231 is a Bragg grating structure (that is a three-dimensional grating), a refractive index of the grating structure in a certain direction is periodically changed. In FIG. 3A, a dark fringe surface having an interplanar spacing $d_1$ indicates a grating period of the volume grating portion, and the dark fringe surface is the first grating fringe surface 1211. The dark fringe surface is also an illuminating surface, and a refractive index of a material of the dark fringe surface is greater than a refractive index of a material of a surrounding non-fringe surface. The first grating fringe surface 1211 is located on an angle bisector of an angle β between an incident direction of an incident beam and an emergent direction of an emergent beam in the first volume grating portion 1231, the incident direction of the incident beam and the emergent direction of the emergent beam herein represent a vector direction.

For example, in the present embodiment, the first grating fringe surface 1211 is located on an angle bisector of an angle between an extension line of the incident beam and the emergent beam in the first volume grating portion 1231. The angle between the first grating fringe surface 1211 and the direction of the incident beam is $\theta_1$ (an acute angle), the $\theta_1$ is a grazing angle i of the incident light on the first grating fringe surface 1211.

The first volume grating portion 1231 provided by the present embodiment is a reflection-type volume Bragg grating structure, beam diffracts after being incident into the first volume grating portion 1231. Upon a grazing angle i of the incident light satisfying a formula of $2*n*d_1*\sin i=\lambda_{\alpha 1}$ (Braggs law), a diffraction maximum can be obtained in a direction of diffraction light in a case that an angle between the diffraction light and the first grating fringe surface 1211 is i. The n in the formula is a refractive index of a white region of the non-fringe surface of the first volume grating portion 1231, that is, the n is the refractive index of the light guide portion 122 in the volume grating layer 120 (that is the refractive index of the light guide structure 100). The $\lambda_{\alpha 1}$ in the formula is a wavelength of beam which generates the diffraction maximum in the direction that the angle between the diffraction light and the first fringe surface 1211 is i. Therefore, upon a grazing angle of the incident light with a certain wavelength on the first grating fringe surface 1211 being equal to an angle between the diffraction light and the first grating fringe surface 1211, that is the grazing angle and the angle being i, the diffraction maximum can be obtained in the direction of the diffraction light in a case that the angle between the diffraction light and the first grating fringe surface 1211 is i, and other beams that do not satisfy the above wavelength conditions will pass through the first volume grating portion 1231, and continue to propagate in the direction of the incident beam.

For example, as illustrated in FIG. 3A, because the grazing angle of the incident light is equal to the angle between the diffraction light and the first grating fringe surface 1211, assuming that the first grating fringe surface 1211 is regarded as a mirror surface, only upon reflection optical path differences of adjacent fringe surfaces satisfying a condition of in-phase addition, that is the Bragg condition (the optical path difference is equal to one wavelength of the light wave), the luminous intensity of the diffraction light can be extremely strong. Thus, the first volume grating portion 1231 plays a role of selective reflection, that is, the first volume grating portion 1231 can select to introduce the beam of the specific wavelength into the light guide plate.

For example, upon the light of the first color incident into the first volume grating portion 1231 being red light, and wavelength $\lambda_R$ of red light satisfying $2*n*d_1*\sin i=\lambda_R$, the first volume grating portion 1231 is configured to only introduce red light in the incident beam into the light guide plate 110. The wavelength of red light can refer to wavelength of red light in RGB three-primary colors specified by the International Commission on Illumination (CIE); and the wavelength of red light can also refer to the wavelength of the main peak in red band, the present embodiment is not limited thereto.

For example, as illustrated in FIG. 3A, an angle between the diffraction light emitted from the first volume grating portion 1231 and a normal line of the light exit surface of the first volume grating portion 1231 is $\alpha_1$, and a relationship of $\alpha_1=\pi-2*\theta_1$ can be obtained according to the geometry law.

The total reflection critical angle C of the light guide structure satisfies: $C=\arcsin(n'/\ln)$ (laws of total internal reflection), wherein n' is a refractive index of a medium around the light guide structure. For example, n' can be a refractive index of the light source layer and/or a refractive index of the light extraction structure. Therefore, upon C being less than or equal to $\alpha_1$, the beam introduced into the light guide plate can be totally reflected and propagated in the light guide structure to make full use of the light energy.

Figure 3B:
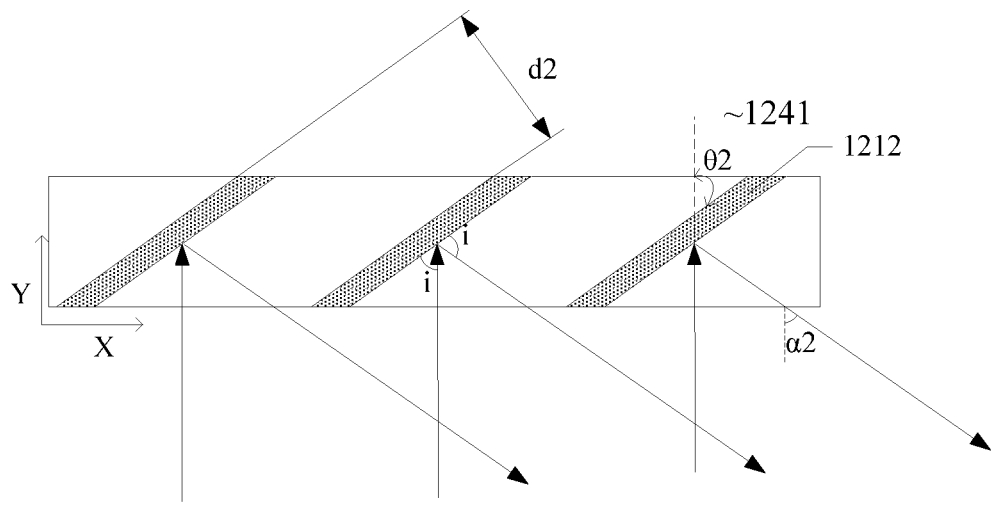
FIG. 3B is a section view of a second volume grating portion in a second volume grating layer of the backlight module shown in FIG. 2A along an XY direction.

For example, FIG. 3B is a section view of a second volume grating portion in a second volume grating layer of the backlight module shown in FIG. 2A along an XY plane. As illustrated in FIG. 2A and FIG. 3B, the second volume grating layer 124 includes a second volume grating portion 1241, the second volume grating portion 1241 includes a second grating fringe surface 1212. The second volume grating portion 1241 is configured to only introduce light of a second color in the incident beam, such as green light, into the light guide plate and the light guide portion, and beams of other brands other than the light of second color can transmit the second volume grating portion 1241 and continue to propagate in a direction of an original incident beam. In the present embodiment, an angle between the second grating fringe surface 1212 of the second volume grating portion 1241 is $\theta_2$ (an acute angle), an angle between diffraction light emitted from the second volume grating portion 1241 and the normal line of the light exit surface of the second volume grating portion 1241 is $\alpha_2$.

For example, in an example of the present embodiment, the angle $\theta_2$ and the angle $\alpha_2$ in the second volume grating portion 1241 are the same as the angle $\theta_1$ and the angle $\alpha_1$ in the first volume grating portion 1231. In the present embodiment, an interplanar spacing between adjacent second grating fringe surfaces 1212 in the second volume grating portion 1241 is $d_2$, the present example takes an example that the interplanar spacing $d_2$ is different from an interplanar spacing $d_1$ between the adjacent first grating fringe surface 1211 of the first volume grating portion 1231, the light of the second color incident into the second volume grating portion 1241 is green light, and wavelength $\lambda_G$ of green light satisfying $2*n*d_2*\sin i=\lambda_G$. Therefore, the second volume grating portion 1241 is configured to only introduce green light in the incident beam into the light guide plate the light guide portion. The wavelength of green light can refer to wavelength of green light in RGB three-primary colors specified by the International Commission on Illumination (CIE); and the wavelength of green light can also refer to the wavelength of the main peak in green band, the present embodiment is not limited thereto.

Figure 3C:
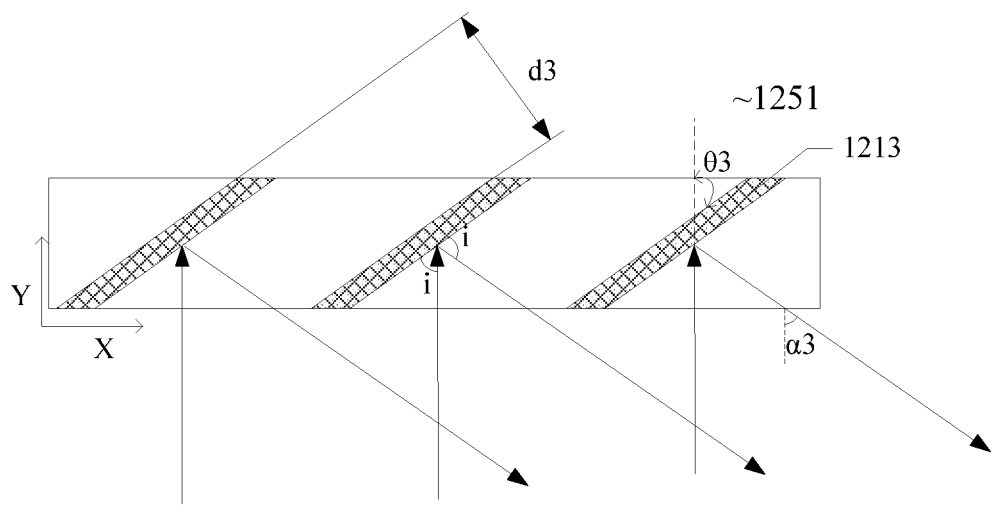
FIG. 3C is a section view of a third volume grating portion in a third volume grating layer of the backlight module shown in FIG. 2A along an XY direction.

For example, FIG. 3C is a section view of a third volume grating portion in a third volume grating layer of the backlight module shown in FIG. 2A along an XY plane. As illustrated in FIG. 2A and FIG. 3C, the third volume grating layer 125 includes a third volume grating portion 1251, the third volume grating portion 1251 includes a third grating fringe surface 1213. The third volume grating portion 1251 is configured to only introduce light of a third color in the incident beam, such as blue light, into the light guide plate and the light guide portion. In the present embodiment, an angle between the third grating fringe surface 1213 of the third volume grating portion 1251 is $\theta_3$ (an acute angle), an angle between diffraction light emitted from the third volume grating portion 1251 and a normal line of a light exit surface of the third volume grating portion 1251 is $\alpha_3$.

For example, in an example of the present embodiment, the angle $\theta_3$ and the angle $\alpha_3$ in the third volume grating portion 1251 are the same as the angle $\theta_1$ ($\theta_2$) and the angle $\alpha_1$ ($\alpha_2$) in the first volume grating portion 1231 (the second volume grating portion 1241). In the present embodiment, an interplanar spacing between adjacent third grating fringe surfaces 1213 in the third volume grating portion 1251 is $d_3$, the present example takes an example that the interplanar spacing $d_3$ is different from an interplanar spacing $d_1$ ($d_2$) between the adjacent first grating fringe surface 1211 (the second grating fringe surface 1212), the light of the third color incident into the third volume grating portion 1251 is blue light, and wavelength $\lambda_B$ of blue light satisfying $2*n*d_3*\sin i = \lambda_B$. Therefore, the third volume grating portion 1251 is configured to only introduce blue light in the incident beam into the light guide plate the light guide portion. The wavelength of blue light can refer to wavelength of blue light in RGB three-primary colors specified by the International Commission on Illumination (CIE); and the wavelength of blue light can also refer to the wavelength of the main peak in blue band, the present embodiment is not limited thereto.

Therefore, the examples as mentioned above in the present embodiment can assume that an angle between the diffraction light emitted from each volume grating portion and the normal line of the light exit surface of the corresponding volume grating portion is a, that is $\alpha_1 = \alpha_2 = \alpha_3 = a$. In the same time, an angle between the grating fringe surface in each volume grating portion and the incident beam is $\theta$ (an acute angle), that is $\theta_1 = \theta_2 = \theta_3 = \theta$, so as to design the grating fringe period of each volume grating portion to achieve reflection of beams of different bands.

For example, upon the light sources 210 being collimation light sources, and red light, green light and blue light in the beams being red light, green light and blue light in RGB three-primary colors specified by the International Commission on Illumination (CIE), there is no beam emitted from the three volume grating portion 1251 after the beams enter into the three volume grating portion 1251; upon wavelengths in red light, green light and blue light in the beams which satisfy Braggs law selecting a wavelength of main peak in each band, and a width of full width half maximum of each band being not narrow enough, after the light emitted by the light sources 210 enter into the third volume grating portion 1251, there is still beam emitted from the third volume grating portion 1251.

For example, a thickness of the light guide plate 110 provided by the present embodiment is not greater than 1 mm.

For example, in the present embodiment, the first volume grating layer 123 has a thickness of 5-20 µm, the second volume grating layer 124 has a thickness of 5-20 µm, and the third volume grating layer 125 has a thickness of 5-20 µm. Therefore, a thickness of the light guide structure provided by the present embodiment is not greater than 1.06 mm.

It can be known from the embodiments as mentioned above, the beam incident into the volume grating layer can be totally reflected and propagated in the light guide structure, therefore, the backlight module does not need a light mixing height. Comparing with a general direct-lit type backlight module which needs a mixing height of 2.64 cm, the thickness of the light guide structure in the present embodiment is only of the order of millimeter, so as to greatly reduce the thickness of the backlight module, and make full use of the light energy.

For example, as illustrated in FIG. 2A, the backlight module provided by embodiments of the present disclosure further includes a reflective layer 400, located on a side of the light source layer 200 away from the light guide structure 100. For example, the reflective layer 400 can be a metal layer, which is configured to reflect the beam that is emitted from a surface of the light guide structure 100 facing the light source layer 200 to the reflective layer 400, so as to improve the utilization of the light energy.

For example, as illustrated in FIG. 2A, the light extraction structure 300 includes a dot film 310 located on a surface of the light guide structure 100 away from the light source layer 200. For example, a material of the dot film 310 can be the same as that of the light guide structure 100, the dot film 310 is distributed with dots having a concave-convex. For example, a maximum size of a dot intercepted in parallel with a plane of the light guide structure 100 can be 0.1-1 mm, the present embodiment includes but is not limited thereto. For example, the dot film 310 can also be a convex-concave structure disposed on a surface of the volume grating layer 120 away from the light source layer 200.

In order to extract light from the light guide structure 100 uniformly, in a direction from being close to a light exit side of the volume grating portion 121 to being away from the volume grating portion 121 and parallel to a main plane of the light guide plate 110, a distribution density of the dots in the dot film 310 between adjacent light sources 210 is changed from small to large. The present embodiment is described by taking a case that the light introduced into the light guide plate 110 and the light guide portion 122 from the volume grating layer 120 can totally reflected and propagated in the X direction. In the X direction, the distribution density of the dots in the dot film 310 changes periodically.

For example, in the X direction, the distribution density of the dots in the dot film 310 between adjacent light sources 210 is from small to large, that is, a number of distribution of the spots is from less to more. Therefore, in the X direction, a distribution density variation regulation of the dots in the dot film 310 is periodically changed by taking the distribution density of the dots between two light sources 210 as one period. The light extracted from a position where the distribution density of the dots in the dot film 310 is small is relatively small with respect to the position where the distribution density of the dots in the dot film 310 is large.

For example, FIG. 2A is described by taking a case that the dot film 310 is located in A region, B region and C region. From the A region to the C region, the distribution density of the dots in the dot film 310 is changed from small to large. Upon the light propagated in the light guide structure 100 propagating to the dot film 310, because the dot film 310 in each region will extract a part of light, in a direction from the A region to the C region, a density of light in the light guide structure 100 changes from large to small. Thus, the distribution density of the dots in the dot film 310 matches the variation of light density in the light guide structure 100, the dot film 310 can extract light with approximately same energy from the light guide structure 100 located in the A region, B region and C region to realize a function of uniform light extraction.

For example, the dot film 310 can also be a specific one-dimensional structure, or a specific two-dimensional structure and so on, the present embodiment is not limited thereto. The dot film is mainly designed for a specific light exit situation of the light source and the volume grating layer to realize the uniform distribution of backlight intensity.

For example, because the beam in the backlight module provided by the present embodiment is totally reflected and propagated in the X direction, in a direction perpendicular to the XY surface (Z direction in the example illustrated in FIG. 2B), the dot film 310 located between adjacent light sources 210 can dispose uniformly distributed dots, can also dispose no dot, the present embodiment is not limited thereto. Furthermore, the dot film 310 located on the volume grating portion 121 can or cannot be provided with dots, the present embodiment is not limited thereto.

For example, as illustrated in FIG. 2A, the light extraction structure 300 further includes a diffusion film 320 located on a side of the dot film 310 away from the light guide structure 100.

For example, the diffusion film 320 can include a polymer (such as polycarbonate, polymethylmethacrylate, polyethylene terephthalate and so on) substrate with high transmittance and scattering particles (such as $TiO_2$) doping in the substrate.

For example, the diffusion film 320 can also be a laminated structure including a plurality of films. Light passing through the diffusion film 320 can be scattered by the scattering particles therein, so that light sensed by an observer is a brightness distribution directly provided by a surface of the diffusion film 320.

For example, as illustrated in FIG. 2A, the light extraction structure 300 further includes a prism film 330 located on a side of the diffusion film 320 away from the light guide structure 100.

For example, the prism film 330 can be formed by attaching a prism layer with a sharp-angle micro-prism structure to a substrate layer, and the prism film is configured to concentrate large-angle light at a small angle to increase viewing brightness at a center-view.

For example, as illustrated in FIG. 3A to FIG. 3C, another example of the embodiment of the present disclosure provides that the interplanar spacing $d_1$ between adjacent first grating fringe surfaces 1211 in the first volume grating portion 1231, the interplanar spacing $d_2$ between adjacent second grating fringe surfaces 1212 in the second volume grating portion 1241 and the interplanar spacing $d_3$ between adjacent third grating fringe surfaces 1213 in the third volume grating portion 1251 are the same, that is $d_1=d_2=d_3=d$. Because the angle θ (an acute angle) between the grating fringe surface and the direction of the incident beam is the grazing angle i of the incident light to the grating fringe surface, and the angle $θ_1$ between the first grating fringe surface 1211 and the direction of the incident beam, the angle $θ_2$ between the second grating fringe surface 1212 and the direction of the incident beam, the angle $θ_3$ between the third grating fringe surface 1213 and the direction of the incident beam are all different. Upon the light of the first color incident into the first volume grating portion 1231 being red light, and wavelength $λ_R$ of red light satisfying $2*n*d*\sin θ_1=λ_R$, the first volume grating portion 1231 is configured to only introduce red light in the incident beam into the light guide plate and the light guide portion; upon the light of the second color incident into the second volume grating portion 1241 being green light, and wavelength $λ_G$ of green light satisfying $2*n*d*\sin θ_2=λ_G$, the second volume grating portion 1241 is configured to only introduce green light in the incident beam into the light guide plate and the light guide portion; upon the light of the third color incident into the third volume grating portion 1251 being blue light, and wavelength $λ_B$ of blue light satisfying $2*n*d*\sin θ_3=λ_B$, the third volume grating portion 1251 is configured to only introduce blue light in the incident beam into the light guide plate the light guide portion. Therefore, in the example, in a case that the grating fringe period of each volume grating portion is given to be d, that is $d_1=d_2=d_3=d$, the angle between the grating fringe surface in each volume grating portion can be designed to achieve reflection of light in different wave bands.

It should be noted that, in the example, because a relationship between the angle α which is formed between the diffraction light emitted from each volume grating portion and the normal line of the light exit surface and the angle θ which is formed between the grating fringe surface of each volume grating portion and the incident beam satisfies $α=η-2*θ$, upon the angle θ between the grating fringe surface in each volume grating portion and the incident beam being designed to satisfy a relationship that the total reflection critical angle C of the light guide structure is less than or equal to a, that is, the specified grating fringe period d in each volume grating portion should ensure the relationship that the total reflection critical angle C of the light guide structure is less than or equal to a.

For example, as illustrated in FIG. 3A to FIG. 3C, another example of the embodiment of the present disclosure provides that each volume grating portion can have different grating fringe periods d, the angles θ between grating fringe surface in each volume grating portion and the incident beam can also be different. Under a premise of ensuring the relationship that the total reflection critical angle C of the light guide structure is less than or equal to a, a flexible design of d and θ is used to realize the reflection of different wave bands.

In summary, embodiments of the present disclosure can adjust at least one of the grating fringe period of the volume grating portion, and the angle between the grating fringe surface included in the volume grating portion and the incident beam to realize that the volume grating portion is configured to introduce the beam with the specific wavelength into the light guide portion and the light guide plate. That is, in the first grating fringe surface, the second grating surface and the third grating fringe surface, at least one of the grating fringe periods and the angles between the grating fringe surface and the incident beam are different.

Figure 4:
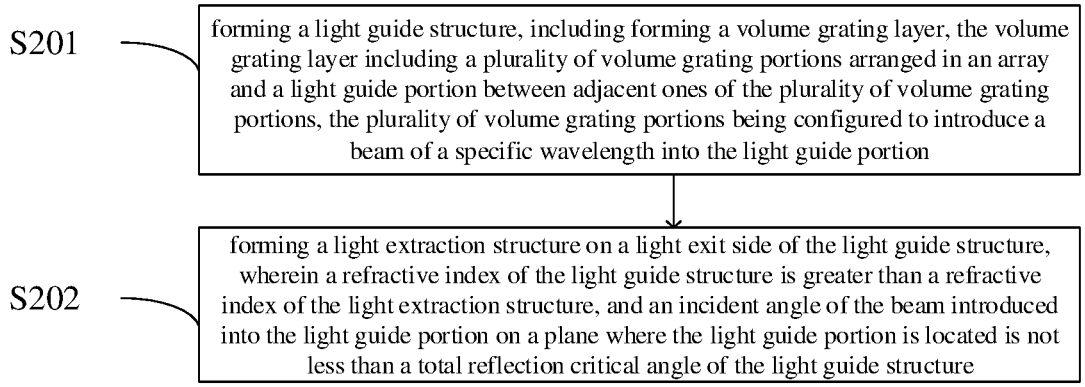
FIG. 4 is a flow chart of a manufacturing method of a backlight module provided by an embodiment of the present disclosure.

Another embodiment of the present disclosure provides a manufacturing method of a backlight module, FIG. 4 is a flow chart of a manufacturing method of a backlight module provided by an embodiment of the present disclosure. As illustrated in FIG. 4, the manufacturing method includes the following steps.

S201: forming a light guide structure, including forming a volume grating layer, the volume grating layer including a plurality of volume grating portions arranged in an array and a light guide portion between adjacent ones of the plurality of volume grating portions, the plurality of volume grating portions being configured to introduce a beam of a specific wavelength into the light guide portion.

S202: forming a light extraction structure on a light exit side of the light guide structure, wherein a refractive index of the light guide structure is greater than a refractive index of the light extraction structure, and an incident angle of the beam introduced into the light guide portion on a plane where the light guide portion is located is not less than a total reflection critical angle of the light guide structure.

In the backlight module manufactured by the manufacturing method provided by the present embodiment, the volume grating structure can introduce the light emitted by a light source into the light guide portion, the light introduced into the light guide portion is totally reflected and propagated in the light guide structure, and is uniformly extracted by the light extraction structure. Therefore, on one hand, the backlight module can fully utilize light energy; on the other hand, the light source in the backlight module does not need a light mixing height, thereby effectively reducing the thickness of the backlight module.

For example, the manufacturing method of the backlight module in the present embodiment further includes: disposing a light source layer on a light incident side of the light guide structure. The light source layer includes a plurality of light sources arranged in an array, an orthogonal projection of each of the plurality of light sources on the volume grating layer falls within the volume grating portions, and the refractive index of the light guide structure is greater than a refractive index of the light source layer.

For example, forming the volume grating structure further includes forming a light guide plate. The light source layer is disposed on a main plate surface of the light guide plate, the volume grating layer is formed on a side of the light guide plate away from the light source layer, the plurality of volume grating portions are further configured to introduce the beam of the specific wavelength into the light guide plate, and an incident angle of the beam introduced into the light guide plate on a plane where the light guide plate is located is not less than the total reflection critical angle of the light guide structure. In the backlight module manufactured by the manufacturing method provided by the present embodiment, the volume grating structure can introduce the light emitted by a light source into the light guide portion and the light guide plate, the light introduced into the light guide portion and the light guide plate is totally reflected and propagated in the light guide structure, and is uniformly extracted by the light extraction structure.

For example, the plurality of volume grating portions and the plurality of light sources are arranged in two-dimensional array, and the light guide portion is disposed around the volume grating portion.

For example, all of the light source, the volume grating portion and the light guide portion have a plane shape of strip shape, and the volume grating portions and the light guide portions are alternately disposed, that is, the plurality of volume grating portions and the plurality of light sources are arranged in one-dimensional array.

For example, the light sources in the light source layer are collimation light sources.

For example, the plurality of light sources included in the light source layer are dot-matrix lights, the dot-matrix lights can include a combination of dot-matrix light emitting diodes (LED) and a collimation lens array, can also include a combination of a dot-matrix original light-emitting diodes (OLED) and a collimation lens array. The present embodiment is not limited thereto.

For example, the volume grating layer includes: a first volume grating layer, a second volume grating layer and a third volume grating layer. The first volume grating layer includes a first volume grating portion, the first volume grating portion includes a first grating fringe surface. The first volume grating portion is configured to only introduce light of a first color in the incident beam, such as red light, into the light guide plate and the light guide portion. The second volume grating layer includes a second volume grating portion, the second volume grating portion includes a second grating fringe surface. The second volume grating portion is configured to only introduce light of a second color in the incident beam, such as green light, into the light guide plate and the light guide portion. The third volume grating layer includes a third volume grating portion, the third volume grating portion includes a third grating fringe surface. The third volume grating portion is configured to only introduce light of a third color in the incident beam, such as blue light, into the light guide plate and the light guide portion.

For example, upon making each volume grating layer, forming the volume grating portion includes: irradiating and exposing both sides of a photorefractive material by two plane light waves. The photorefractive material herein refers to a material whose refractive index changes after exposure. For example, the photorefractive material can include a material such as Fe-,Cu-doped lithium niobate crystal, the present embodiment is not limited thereto. The two plane light waves interfere in the photorefractive material to form three-dimensional interference fringes. The three-dimensional interference fringes is the grating fringe surfaces in the volume grating portion, the photorefractive material after forming the volume grating portion is the volume grating layer. A refractive index of a material in the grating fringe surface is greater than a refractive index of a material outside the region of the grating fringe surface.

For example, each volume grating portion is a Bragg grating structure (that is a three-dimensional grating), a refractive index of the grating structure in a certain direction is periodically changed. A grating fringe period of each volume grating portion is d, the grating fringe surface in the volume grating portion is located on an angle bisector of an angle between an incident direction of an incident beam and an emergent direction of an emergent beam in the volume grating layer, and an angle θ (an acute angle) between the grating fringe surface and the direction of the incident beam is a grazing angle i of the incident light on the first grating fringe surface. An angle between diffraction light emitted from the volume grating portion and the normal line of the light exit surface of the volume grating portion is a, and a relationship of $\alpha=\pi-2*\theta$ can be obtained according to the geometry law. The volume grating portion provided by the present embodiment is a reflection-type volume Bragg grating structure, and the beam diffracts after incident to the volume grating portion. Upon a grazing angle i of the incident light satisfying a formula of $2*n*d*\sin i=\lambda$ (Braggs law), a diffraction maximum can be obtained in a direction of diffraction light in a case that an angle between the diffraction light and the grating fringe surface is i. The n in the formula is a refractive index of a region of the non-fringe surface of the volume grating portion, that is, the n is the refractive index of the light guide portion in the volume grating layer (that is the refractive index of the light guide structure). The 2 in the formula is a wavelength of the beam which is the diffraction maximum in the direction that the angle between the diffraction light and the fringe surface is i. Therefore, upon the grazing angle of the incident light with a certain wavelength on the grating fringe surface being equal to the angle between the diffraction light and the grating fringe surface, that is the grazing angle and the angle being i, the diffraction maximum can be obtained in the direction of the diffraction light in a case that the angle between the diffraction light and the grating fringe surface is i, and other beams that do not satisfy the above wavelength conditions will pass through the volume grating portion, and continue to propagate in the direction of the incident beam. It can be known from Bragg law that the angle θ between the grating fringe surface in each volume grating portion and the incident beam and the grating fringe period d of each volume grating portion play a decisive role in realizing the reflection of beams of different bands. Therefore, in a case that the volume grating layer is manufactured, the requirements of d and θ can be processed to form the grating fringe surface that satisfies the needs.

For example, the formed first volume grating layer has a thickness of 5-20 µm, the formed second volume grating layer has a thickness of 5-20 µm, the formed third volume grating layer has a thickness of 5-20 µm.

For example, a thickness of the light guide plate in the light guide structure is not greater than 1 mm Therefore, a thickness of the light guide structure provided by the present embodiment is not greater than 1.06 mm Because the beam incident into the volume grating layer can be totally reflected and propagated in the light guide structure, the backlight module does not need a light mixing height, and the thickness of the light guide structure in the present embodiment is relatively small, so as to greatly reduce the thickness of the backlight module.

For example, a reflective layer can be disposed on a side of the light source layer away from the light guide structure to improve the utilization of the light energy.

For example, forming the light extraction structure can include forming a dot film on a side of the light guide structure away from the light source layer. In order to extract light from the light guide structure uniformly, in a direction from being close to a light exit side of the volume grating portion to being away from the volume grating portion and parallel to a main plane of the light guide plate, a distribution density of the dots in the dot film between adjacent light sources changes from small to large.

For example, a diffusion film is formed on a side of the dot film away from the light guide structure.

For example, the diffusion film can include a polymer (such as polycarbonate, polymethylmethacrylate, polyethylene terephthalate and so on) substrate with high transmittance and scattering particles (such as $TiO_2$) doping in the substrate.

For example, the diffusion film can also be a laminated structure including a plurality of films. Light passing through the diffusion film can be scattered by the scattering particles therein, so that light sensed by an observer is a brightness distribution directly provided by a surface of the diffusion film.

For example, a prism film is formed on a side of the diffusion film away from the light guide structure. For example, the prism film can be formed by attaching a prism layer with a sharp-angle micro-prism structure to a substrate layer, the prism film is configured to concentrate large-angle light at a small angle to increase viewing brightness at a center-view.

Another embodiment of the present disclosure provides a display device, the display device utilizes the backlight module provided by the embodiments as mentioned above. On one hand, the backlight module can fully utilize the light energy, and because there is no special requirement for the spacing between the light sources, the number of light sources can be reduced and the cost can be reduced while satisfying the overall brightness; on the other hand, the light source in the backlight module does not need a light mixing height, thereby effectively reducing a thickness of the backlight module.

For example, the display device can be a liquid crystal display device and any display product or component having a display function such as a television, a digital camera, a mobile phone, a watch, a tablet computer, a notebook computer, a navigator, and the like including the display device, the present embodiment is not limited thereto.

Another embodiment of the present disclosure provides a light guide device, as illustrated in FIG. 2A, the light guide device provided by the present embodiment includes a light guide structure 100 and a light extraction structure 300. The light guide structure 100 includes a volume grating layer 120, the volume grating layer 120 includes a plurality of volume grating portions 121 arranged in an array and a light guide portion 122 between adjacent ones of the plurality of volume grating portions 121, the plurality of volume grating portions 121 are configured to introduce a beam of a specific wavelength into the light guide portion 122, and an incident angle of the beam introduced into the light guide portion 122 on a plane where the light guide portion 122 is located is not less than a total reflection critical angle of the light guide structure 100; the light extraction structure 300 is located on a light exit side of the light guide structure 100, and a refractive index of the light guide structure 100 is greater than a refractive index of the light extraction structure 300.

The performance and the structure of the light guide structure and the light extraction structure included in the light guide device provided by the present embodiment are the same as the light guide structure and the light extraction structure in the embodiments as mentioned above, which are not repeated herein.

For example, the light guide device provided by the present embodiment can be applied to the backlight module or the display device as mentioned above, so that the light guide device can not only fully utilize light energy, but also effectively reduce the thickness of the backlight module.

The following points should to be explained:

(1) Unless otherwise defined, in the embodiments and accompanying drawings in the present disclosure, the same reference numeral represents the same meaning.

(2) The accompanying drawings involve only the structure(s) in connection with the embodiment(s) of the present disclosure, and other structure(s) can be referred to common design(s).

(3) For the purpose of clarity, in accompanying drawings for illustrating the embodiment(s) of the present disclosure, layer(s) or region(s) may be enlarged. However, it should understood that, in the case in which a component or element such as a layer, film, region, substrate or the like is referred to be "above" or "below" another component or element, it may be directly above or below the another component or element or a component or element is interposed therebetween.

The foregoing is only the embodiments of the present disclosure and not intended to limit the scope of protection of the present disclosure, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. A backlight module, comprising:
   a light guide structure, comprising a volume grating layer, the volume grating layer comprising a plurality of volume grating portions arranged in an array and a light guide portion between adjacent ones of the plurality of volume grating portions, the plurality of volume grating portions being configured to introduce a beam of a specific wavelength into the light guide portion; and
   a light extraction structure, located on a light exit side of the light guide structure,
   wherein a refractive index of the light guide structure is greater than a refractive index of the light extraction structure.

2. The backlight module according to claim 1, wherein the plurality of volume grating portions are further configured so that an incident angle of the beam introduced into the light guide portion on a plane where the light guide portion is located is not less than a total reflection critical angle of the light guide structure.

3. The backlight module according to claim 2, further comprising:
a light source layer, comprising a plurality of light sources arranged in an array, an orthogonal projection of each of the plurality of light sources on the volume grating layer falling within one of the plurality of volume grating portions,
wherein the light guide structure is located on a light exit side of the light source layer, and the refractive index of the light guide structure is greater than a refractive index of the light source layer.

4. The backlight module according to claim 3, wherein the light sources are collimation light sources.

5. The backlight module according to claim 4, wherein the volume grating layer is a stacked structure, comprising:
a first volume grating layer, comprising a first volume grating portion, the first volume grating portion being configured to only introduce light of a first color in the incident beam into the light guide portion and the light guide plate, wherein the first volume grating portion comprises a first grating fringe surface;
a second volume grating layer, comprising a second volume grating portion, the second volume grating portion being configured to only introduce light of a second color in the incident beam into the light guide portion and the light guide plate, wherein the second volume grating portion comprises a second grating fringe surface;
a third volume grating layer, comprising a third volume grating portion, the third volume grating portion being configured to only introduce light of a third color in the incident beam into the light guide portion and the light guide plate, wherein the third volume grating portion comprises a third grating fringe surface.

6. The backlight module according to claim 5, wherein each of the first volume grating layer, the second volume grating layer and the third volume grating layer has a thickness in a range of 5-20 μm.

7. The backlight module according to claim 5, wherein the light sources are configured to emit light along a direction perpendicular to the light source layer.

8. The backlight module according to claim 5, wherein a grating fringe period of the first volume grating portion, a grating fringe period of the second volume grating portion, and a grating fringe period of the third volume grating portion are not all equal, and/or, an angle between the first grating fringe surface and the incident beam, an angle between the second grating fringe surface and the incident beam, and an angle between the third grating fringe surface and the incident beam are not all equal.

9. The backlight module according to claim 3, further comprising:
a reflective layer, located on a side of the light source layer away from the light guide structure.

10. The backlight module according to claim 3, further comprising:
a driver circuit, connected with the plurality of light sources, and configured to adjust luminous intensity of each of the plurality of light sources.

11. The backlight module according to claim 2, wherein the light extraction structure comprising:
a dot film, located on a surface of a light exit side of the volume grating layer.

12. The backlight module according to claim 2, wherein the light guide structure further comprises a light guide plate, the light guide plate is located on a side of the volume grating layer away from the light extraction structure, the plurality of volume grating portions are further configured to introduce the beam of the specific wavelength into the light guide plate.

13. The backlight module according to claim 12, wherein the plurality of volume grating portions are further configured so that an incident angle of the beam introduced into the light guide plate on a plane where the light guide plate is located is not less than the total reflection critical angle of the light guide structure.

14. The backlight module according to claim 12, wherein a refractive index of the light guide portion of the volume grating layer is equal to a refractive index of the light guide plate.

15. The backlight module according to claim 12, wherein a thickness of the light guide plate is not greater than 1 mm.

16. A display device, comprising the backlight module according to claim 1.

17. A light guide device, comprising:
a light guide structure, comprising a volume grating layer, the volume grating layer comprising a plurality of volume grating portions arranged in an array and a light guide portion between adjacent ones of the plurality of volume grating portions, the plurality of volume grating portions being configured to introduce a beam of a specific wavelength into the light guide portion; and
a light extraction structure, located on a light exit side of the light guide structure,
wherein a refractive index of the light guide structure is greater than a refractive index of the light extraction structure.

18. The light guide device according to claim 17, wherein the plurality of volume grating portions are further configured so that an incident angle of the beam introduced into the light guide portion on a plane where the light guide portion is located is not less than a total reflection critical angle of the light guide structure.

* * * * *